July 18, 1950 L. J. SCHULHOFF 2,515,900
LUBRICATING DEVICE
Filed Jan. 5, 1946 4 Sheets-Sheet 1
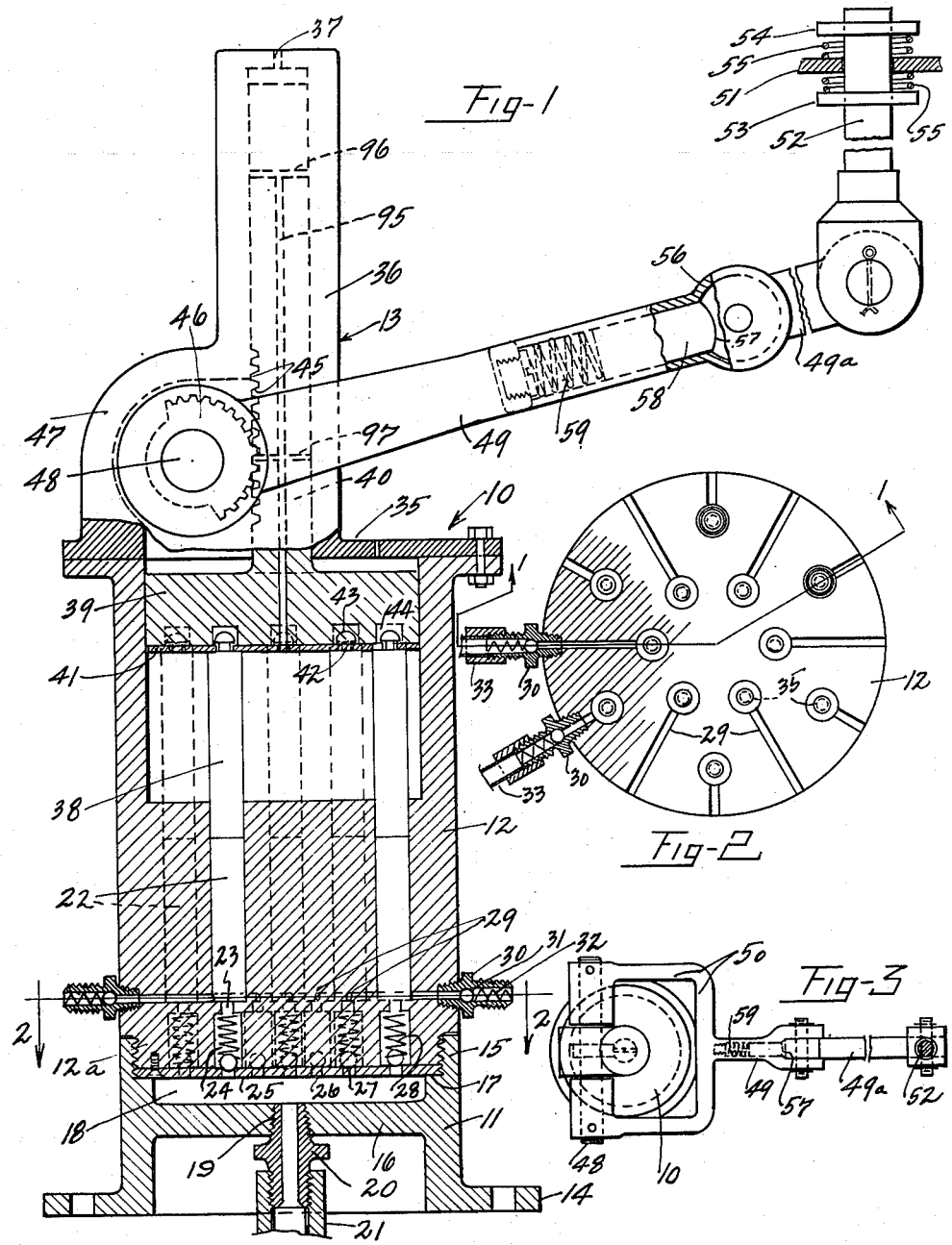
INVENTOR.
LEONARD J. SCHULHOFF
BY
ATTORNEY.

July 18, 1950   L. J. SCHULHOFF   2,515,900
LUBRICATING DEVICE
Filed Jan. 5, 1946   4 Sheets-Sheet 2

INVENTOR.
LEONARD J. SCHULHOFF
BY
ATTORNEY.

July 18, 1950 L. J. SCHULHOFF 2,515,900
LUBRICATING DEVICE
Filed Jan. 5, 1946 4 Sheets-Sheet 3

INVENTOR.
LEONARD J. SCHULHOFF
BY
ATTORNEY.

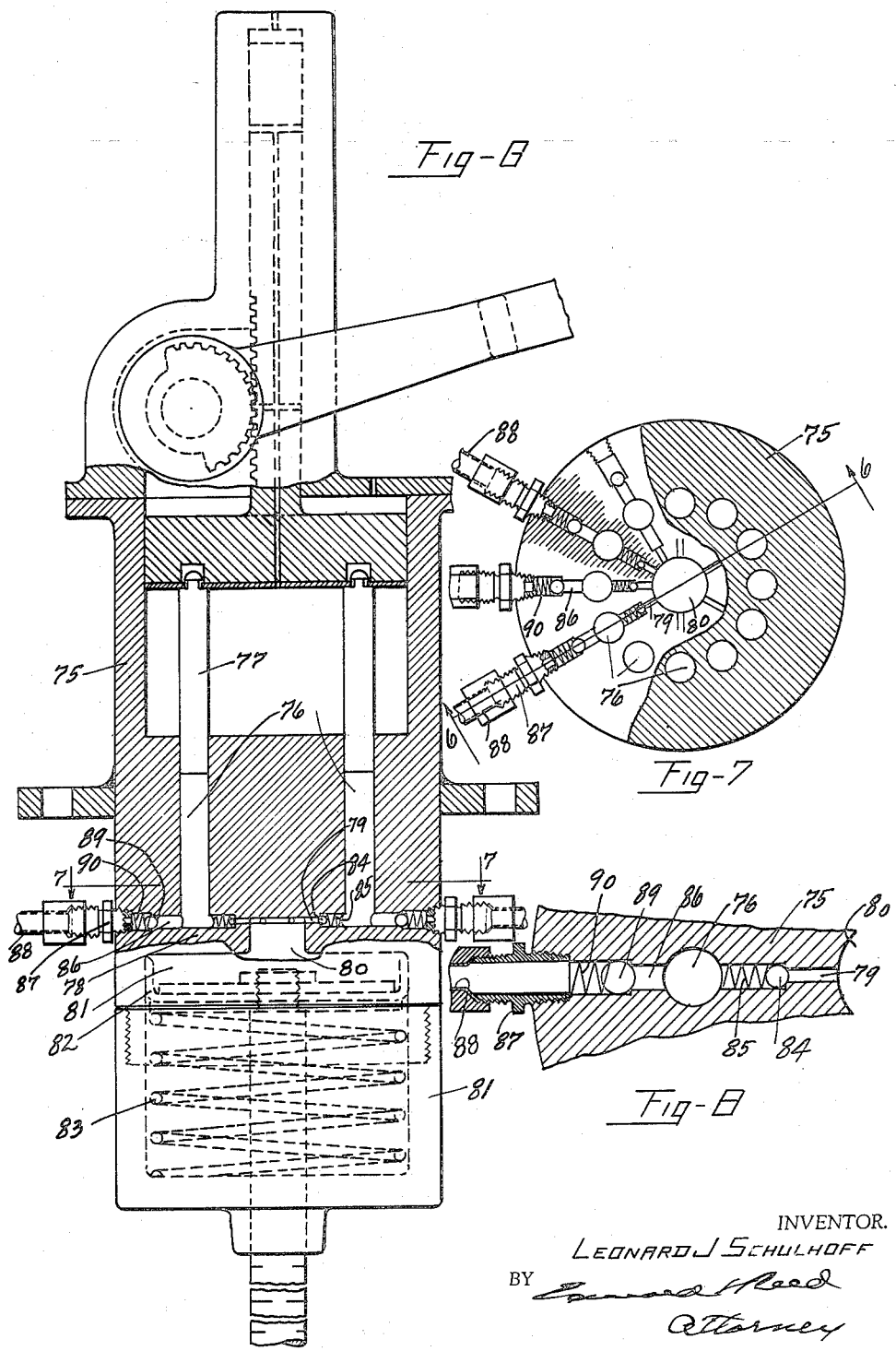

Patented July 18, 1950

2,515,900

UNITED STATES PATENT OFFICE 2,515,900

LUBRICATING DEVICE

Leonard J. Schulhoff, Dayton, Ohio

Application January 5, 1946, Serial No. 639,206

15 Claims. (Cl. 184—27)

This invention relates to a lubricating device which is designed primarily for use on motor vehicles and the like.

One object of the invention is to provide a self-lubricating unit adapted to be mounted on a vehicle and operable by the relative vertical movement of parts of the vehicle to deliver lubricant under pressure to a plurality of bearings on the chassis of the vehicle.

A further object of the invention is to provide a lubricating system comprising a plurality of such units to be mounted on the vehicle adjacent the respective wheels, each unit being controlled by the vertical movement of the wheel with which it is associated to supply lubricant to bearings adjacent said wheel.

A further object of the invention is to provide a lubricating unit which is fully automatic and positive in its operation and which will provide adequate lubrication for each bearing.

A further object of the invention is to provide a lubricating unit which is of simple compact construction and of small size.

A further object of the invention is to provide such a lubricating unit including a lubricant reservoir as a part thereof.

Other objects of the invention may appear as the device is described in detail.

Figure 4:
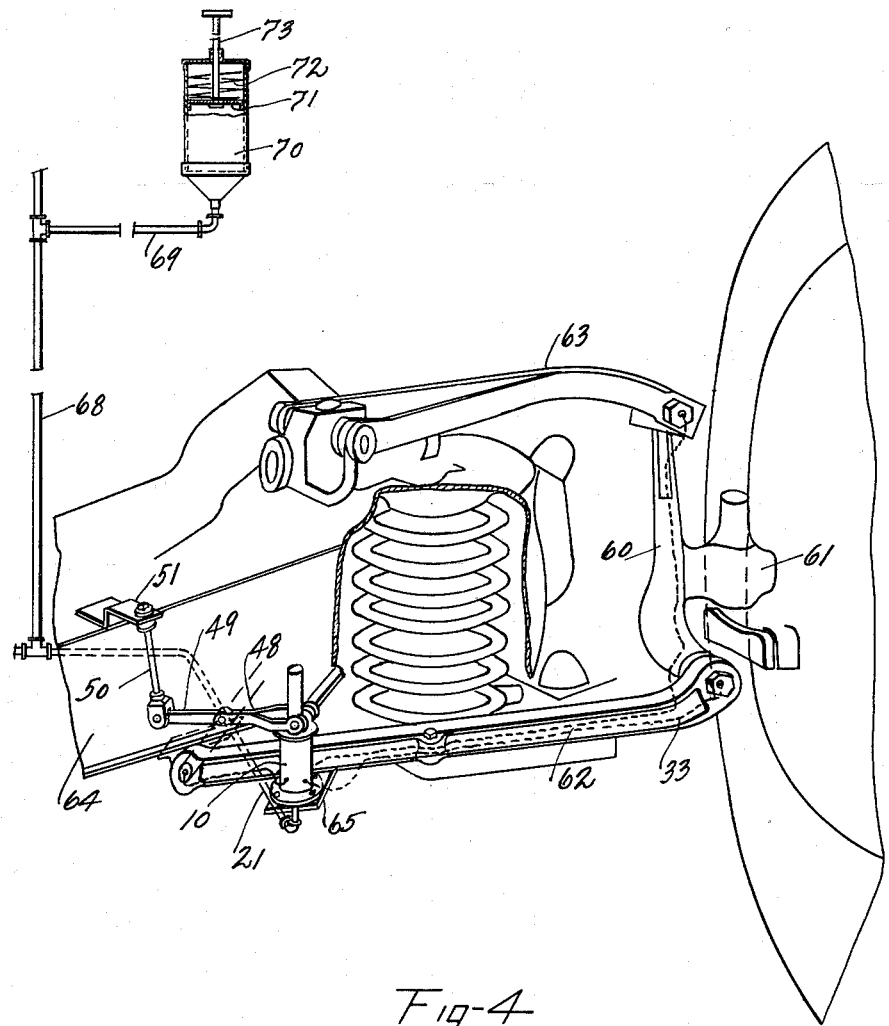
Figure 5:
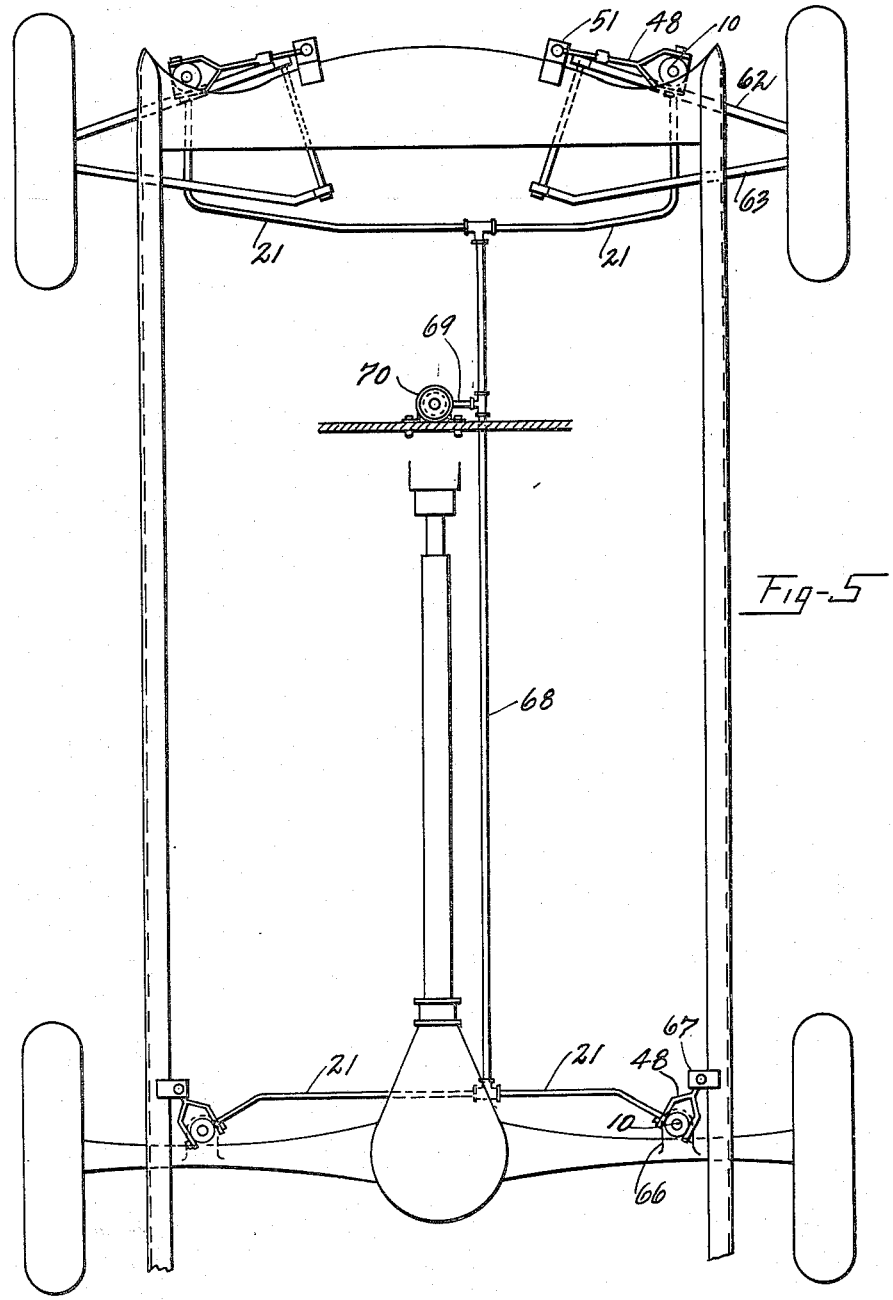

In the accompanying drawings Fig. 1 is a side view of a lubricating unit embodying the invention partly in section on line 1—1 of Fig. 2 and partly in elevation; Fig. 2 is a transverse section taken on the line 2—2 of Fig. 1; Fig. 3 is a plan view of the lever connection for positively operating the unit; Fig. 4 is a side elevation, partly in section, of the knee action mechanism of an automobile showing one of the lubricating units mounted thereon; Fig. 5 is a plan view of the chassis of an automobile, partly in section, showing lubricating units associated with the respective wheels and connected with a common source of lubricant supply; Fig. 6 is a side view, partly in section and partly in elevation, of a slightly modfied form of the lubricating unit; Fig. 7 is a transverse section taken on the line 7—7 of Fig. 6 and partly broken away to show the several passageways; and Fig. 8 is an enlarged sectional view showing the valves for one passageway.

In these drawings I have illustrated two lubricating units embodying slightly different forms of the invention, each unit comprising a cylindrical casing having within the same a plurality of cylinders, each cylinder having separate valved connection with a source of lubricant supply and separate valved connection with a conduit leading to a part to be lubricated. Mounted in each cylinder is a piston, the several pistons being actuated in unison by a ram or plunger mounted in the casing and connected with and operated by a part which is movable by the wheel with which the unit is associated. Preferably a vehicle is equipped with a plurality of such units mounted adjacent to and operated by the respective wheels and constituting a lubricating system connected with the various chassis bearings. It is to be understood, however, that the device as a whole, as well as the several parts thereof, may take various forms and may be actuated in various ways without departing from the spirit of the invention.

In that embodiment of the invention shown in Figs. 1 to 3 the lubricating unit comprises a casing 10 which is preferably, but not necessarily supported in an upright position. The unit may be of any suitable size and when mounted as herein illustrated is of a size considerably smaller than that shown in Figs. 1 and 6. For convenience of manufacture and assembly the casing 10 is divided transversely into three sections, including a lower section 11, an intermediate section 12 and an upper section 13, rigidly connected one with the other. The lower section 11 is provided with means, such as an apertured flange 14, whereby the unit may be mounted on a part of the vehicle to be lubricated. The upper portion 15 of section 11 is provided with internal screw threads and at a point below the threaded upper portion 15 it is provided with a transverse wall, here shown as a partition 16, which is spaced some distance below the shoulder formed at the lower edge of the screw threaded portion 15. When the unit is assembled the space between the partition 16 and the shoulder 17 constitutes a lubricant chamber 18. The partition 16 is provided with a threaded opening 19, preferably arranged centrally thereof by means of which it may be connected with a source of lubricant supply. As here shown, a fitting 20 is threaded into the opening 19 and is connected by a conduit 21, such as with a source of lubricant supply.

The intermediate section 12 is provided at its lower end with a screw threaded portion 12a extending into the threaded portion 15 of the lower section, rigidly connecting the two sections together. The lower portion of section 12 is in the nature of a block having therein a plurality of longitudinal bores 22 each of which constitutes a separate cylinder. These cylinders are open at their upper ends and terminate some distance above the lower end of section 12. Each cylinder is connected by a small passageway 23 with a second bore 24 in the lower portion of section 12. The lower ends of the bores 24 are closed by a plate 25 rigidly secured to the lower end of section 12 and provided with ports 26 communicating with the lubricant chamber 18. The flow of lubricant through each port is controlled by an inwardly opening valve, here shown as a ball 27 seated in the inner end of the port and held normally in its closed position by a spring 28. Each cylinder 22 is connected with a radial passageway 29 leading from the cylinder to the exterior of the casing and adapted to be connected with a part to be lubricated, preferably by means including a flexible tube. The flow of lubricant through each radial passageway is controlled by an outwardly opening valve which, in the present instance, is contained in a fitting 30 mounted in the wall of the casing in open communication with the corresponding passageway 29 and, as here shown, this valve comprises a ball 31 held in closed position by a spring 32. The fitting 30 may be connected with a part to be lubricated in any suitable manner, as by a flexible conduit 33.

The upper section 13 of the casing may take various forms and is here shown as comprising a disk 35, rigidly secured to the upper end of the intermediate section 12, and a tubular extension 36 projecting upwardly from the disk, said extension being open at its lower end and closed at its upper end, except for a vent 37. A plurality of pistons 38 are mounted in the respective cylinders 22 in section 12 and are connected with an actuating device by which they may be reciprocated in the cylinders to draw lubricant into and discharge the same from the cylinders. In the present arrangement this actuating device is in the form of a ram or plunger including a head 39 having a snug sliding fit in the hollow upper portion of the intermediate section 12, and a shank or rod 40 slidably mounted in the tubular extension 36 of the upper section 13. The pistons are connected with the head 39 for movement therewith and in the arrangement shown a plate 41 is rigidly secured to the lower surface of the head 39 and provided with a plurality of openings in line with the respective cylinders 22, and each piston has at its upper end a reduced portion or stem 42 which extends through the corresponding opening in the plate 41 and is upset, or riveted, as shown at 43 to secure the piston to the plate before the latter is attached to the head, the lower surface of the head being provided with cavities 44 to receive the upset ends of the stems 42. As will be noted in Fig. 1 there is a slight clearance between the plate and each stem 42 and its upset end to permit of limited pivotal movements of the pistons in the event the cylinders are not in exact parallelism with the axial path of the head.

Any suitable means may be provided for reciprocating the ram and in the arrangement shown the shank 40 of the ram is provided with a longitudinal series of rack teeth 45 with which meshes a segmental gear 46 which is arranged in a housing 47 extending laterally from the lower portion of the tubular extension 36 and preferably formed integral therewith. This gear is rigidly secured to a shaft 48 which is journalled in the side walls of the housing and projects outwardly beyond both side walls. The shaft is rotated to impart reciprocatory movement to the ram by a lever 49, one end of which is provided with a fork 50, the arms of which are rigidly secured to the respective ends of the shaft 48.

The outer end of the lever 49 is pivotally connected with a part 51 of the vehicle, this part of the vehicle and that part thereof on which the casing 10 is supported being relatively movable. As here shown, the lever is pivotally connected with a rod 52 which extends through the part 51 and is provided on opposite sides of that part with collars 53 and 54 which are rigidly secured thereto and spaced from the respective sides of the part 51, springs 55 being inserted between the respective collars and the part 51 to maintain the rod normally at substantially right angles to the part 51 but to permit it to tilt with relation to the latter to compensate for the arcuate movement of the end of the lever 49. For the purpose of protecting the apparatus against injury in case the lever is subjected to excessive strain the outer end portion 49a of the lever is yieldably connected with the main inner portion thereof. In the construction shown, the part 49a is pivotally connected with the inner portion of the lever and has at its inner end an arcuate part 56 which is provided with a recess 57. A detent 58 is slidably mounted in a bore in the adjacent end of the inner portion of the lever and is provided with a rounded end which enters the recess 57. A spring 59 holds the detent normally in the recess and exerts sufficient pressure thereon to maintain the two parts of the lever in alinement under normal operating stresses but is adapted to yield and permit the relative movement of the two parts of the lever when the latter is subjected to excessive strain.

The ram is provided with a longitudinal passage 95 which extends through the lower surface of the head 39 and terminates a short distance from the upper end of the shank 40. At its upper end the passage 95 communicates with a transverse passage 96 which leads to the bearing surfaces of the shank and the tubular extension 40. Thus the small quantities of lubricant which escape from the cylinders 22 are utilized to lubricate the ram. The shank 40 is also provided with a second transverse passage 97 communicating with passage 95. One end of passage 97 supplies lubricant to lower portion of shank 40 and the other end thereof delivers lubricant to the housing 47, to lubricate the shaft 48.

The casing 10 and the actuating device or lever may be connected with any suitable parts of the vehicle which are moved toward and from each other by the vertical movement of the vehicle wheel with which the lubricating unit is associated. In Fig. 4 the lubricating unit is shown as mounted on the knee action mechanism with which the wheel is connected and which comprises a part 60 with which the wheel spindle 61 is connected, the upper and lower ends of the part 60 being connected respectively by levers 62 and 63 with the transverse rigid member 64 of the chasis. The casing 10 of the lubricating unit is here shown as mounted on a bracket 65 rigidly secured to the lower lever 62 so that the casing moves with that lever when the latter is moved by the wheel. The part 51 with which the actuating lever is connected is in the nature of a bracket rigidly secured to the fixed part 64. Thus when pivotal movement is imparted to the lever 62 by the vertical movement of the wheel the casing of the lubricating unit is moved with relation to the part 51 and the pistons are caused to reciprocate therein. The point at which the casing is mounted on the lever 62 may be varied according to the amount of movement which it is desired to impart to the casing, the extent of this movement of course determining the amount of lubricant which is delivered to the bearings upon each oscillation of the lever 62. The conduits 33 extend from the casing to various bearings which are to be lubricated but to simplify the illustration only one of these conduits is shown. The supply conduit 21 leads to a lubricant reservoir.

The lubricating units for the rear portion, Fig. 5, of the chassis may be mounted in a suitable location. In the present instance, the casing 10 of each unit is mounted on a bracket 66 carried by the rear axle housing and the actuating lever 48 is connected with a bracket 67 secured to the chassis frame. This particular form of the lubricating unit is designed to permit the several lubricating units of a vehicle to be connected with a common source of lubricant supply. As here shown, the supply conduits 21, which communicate with the lubricant chambers in the casings 10 are connected with a common conduit 68 which in turn is connected by a conduit 69 with a supply reservoir 70, as shown in Figs. 4 and 5. Preferably the supply reservoir is provided with a piston 71 urged downwardly to discharge the lubricant therefrom by a spring 72, the lubricant usually being in the nature of a grease. A rod 73 connected with the piston 71 extends through the top of the reservoir to enable the piston to be manually retracted when the reservoir is to be filled and it also serves as an indicator to indicate the amount of lubricant in the reservoir.

In Figs. 6 to 8 there is shown a slightly modified form of lubricating unit. The casing 75, cylinders 76, piston 77, and the actuating mechanism for the pistons are the same as shown in Fig. 1. In this instance, however, the cylinders 76 terminate adjacent a bottom wall 78 and are connected by radial passageways 79 with a central opening 80 in the bottom wall. This opening communicates directly with a lubricant reservoir 81 rigidly secured to the lower end of the casing 75 in substantial alinement therewith. It preferably comprises a piston 82 actuated by a spring 83 to press the lubricant into the opening 80 which in effect constitutes a small lubricant chamber. The flow of lubricant from the opening 80 through each radial passageway 79 is controlled by a ball valve 84 opening toward the cylinder and held normally on its seat by a spring 85. The spring is retained in the slightly enlarged portion of the passageway by peening over the edge of the passageway where it enters the cylinder. A second passageway 86 leads from each cylinder to the exterior of the casing and is connected by a fitting 87 with a tube 88 leading to the part to be lubricated. The flow of lubricant through the passageway 86 is controlled by an outwardly opening ball valve 89 arranged in an enlarged portion of the passageway and held in its closed position by a spring 90 confined between the same and the inner end of the fitting 87. The operation of this form of lubricating unit is the same as that above described.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. A lubricating apparatus comprising a casing having therein a plurality of cylinders, pistons in the respective cylinders, means adjacent one end of said casing for actuating said pistons, said casing having adjacent the other end thereof an inlet opening, means for constantly supplying lubricant to said opening, passageways in said casing connecting said opening with the adjacent end portions of the respective cylinders, other passageways in said casing leading from said end portions of said cylinders to the exterior of said casing, and means for controlling the flow of lubricant through the respective passageways.

2. A lubricating apparatus comprising a casing having therein a plurality of cylinders, pistons in the respective cylinders, means adjacent one end of said casing for actuating said pistons, said casing having in the other end portion thereof a lubricant chamber and passageways connecting said chamber with the adjacent end portions of said cylinders, an exterior lubricant reservoir in constant communication with said chamber, said casing also having passageways leading from said end portions of said cylinders to the exterior of said casing, and valves to control the flow of lubricant through the respective passageways.

3. A lubricating apparatus comprising a casing having a cavity in one end portion thereof, a lubricant chamber in the other end portion thereof, a plurality of longitudinal cylinders between said cavity and said chamber, passageways connecting said chamber with the adjacent end portions of the respective cylinders, and passageways leading from said end portions of said cylinders to the exterior of said casing, valves to control the flow of lubricant through the respective passageways, pistons in said cylinders having parts extending into said cavity, a reciprocatory actuating device supported in said cavity and operatively connected with said pistons, and means for imparting reciprocatory movement to said actuating device.

4. A lubricating apparatus comprising a casing having a cavity in one end portion thereof, a lubricant chamber in the other end portion thereof, a plurality of longitudinal cylinders between said cavity and said chamber, passageways connecting said chamber with the adjacent end portions of the respective cylinders, and passageways leading from said end portions of said cylinders to the exterior of said casing, valves to control the flow of lubricant through the respective passageways, pistons in said cylinders having parts extending into said cavity, a reciprocatory actuating device supported in said cavity and operatively connected with said pistons, means for imparting reciprocatory movement to said actuating device, and means for maintaining a supply of lubricant in said chamber.

5. A lubricating apparatus comprising a casing having a cavity in one end portion thereof, a lubricant chamber in the other end portion thereof, a plurality of longitudinal cylinders between said cavity and said chamber, passageways connecting said chamber with the adjacent end portions of the respective cylinders, and passageways leading from said end portions of said cylinders to the exterior of said casing, valves to control the flow of lubricant through the respective passageways, pistons in said cylinders having parts extending into said cavity, a reciprocatory actuating device supported in said cavity and operatively connected with said pistons, means for imparting reciprocatory movement to said actuating device, a lubricant reservoir supported exteriorly of said casing in open communication with said chamber, and pressure means for forcing lubricant from said reservoir into said chamber.

6. A lubricating apparatus comprising a casing having therein a plurality of cylinders, pistons in the respective cylinders, means adjacent one end of said casing for actuating said pistons, said casing having in the other end portion thereof a lubricant chamber the inner wall of which is provided with a plurality of ports, and passageways connecting said ports with the adjacent end portions of the respective cylinders, inwardly opening check valves in the respective passageways, said casing also having passageways leading from said end portions of said cylinders to the exterior of said casing, outwardly opening check valves in the respective last mentioned passageways, and means for constantly supplying lubricant to said chamber.

7. A lubricating apparatus comprising a substantially cylindrical casing having a cavity in the upper end portion thereof, a lubricant chamber in the lower end portion thereof having in its upper wall a circular series of ports, a circular series of bores forming longitudinal cylinders in the intermediate portion thereof, passageways connecting said ports with the lower end portions of said cylinders, and substantially radial passageways leading from said portions of said cylinders to the exterior of said casing, valves to control the flow of lubricant through the respective passageways, means for maintaining a supply of lubricant in said chamber, pistons in the respective cylinders having parts extending into said cavity, a piston actuating device slidably mounted in said cavity, and means for operating said actuating device.

8. A lubricating device comprising a casing having a substantially cylindrical cavity in the upper portion thereof, a relatively small central lubricant chamber in the lower portion thereof, a substantially circular series of longitudinal bores forming cylinders in the intermediate portion thereof, radial passageways connecting said chamber with the lower end portions of the respective cylinders, and radial passageways leading from said end portions of said cylinders to the exterior of said casing, valves to control the flow of lubricant through the respective passageways, means for maintaining a supply of lubricant in said chamber, pistons in the respective cylinders having parts extending into said cavity, a piston actuating device slidably mounted in said cavity, and means for operating said actuating device.

9. A lubricating apparatus comprising a casing having a cylindrical cavity in the upper portion thereof, a lubricant chamber in the lower portion thereof, a plurality of bores extending downwardly from the bottom of said cavity and forming cylinders in the intermediate portion of said casing, passageways connecting said chamber with the lower portions of the respective cylinders, and passageways leading from said lower portions of said cylinders to the exterior of said casing, valves to control the flow of lubricant through the respective passageways, pistons in the respective cylinders having parts extending into said cavity, an actuating device comprising a head slidably mounted in said cavity and connected with said pistons, and means for imparting reciprocatory movement to said head and said pistons.

10. A lubricating apparatus comprising a casing having a cylindrical cavity in the upper portion thereof, a lubricant chamber in the lower portion thereof, a plurality of bores extending downwardly from the bottom of said cavity and forming cylinders in the intermediate portion of said casing, passageways connecting said chamber with the lower portions of the respective cylinders, and passageways leading from said lower portions of said cylinders to the exterior of said casing, valves to control the flow of lubricant through the respective passageways, a head slidably mounted in said cavity, pistons in the respective cylinders having parts extending into said cavity and connected with said head for limited pivotal movement with relation thereto, and means for actuating said head to impart reciprocatory movement to said pistons.

11. A lubricating apparatus comprising a casing having a cylindrical cavity in the upper portion thereof, a lubricant chamber in the lower portion thereof, a plurality of bores extending downwardly from the bottom of said cavity and forming cylinders in the intermediate portion of said casing, passageways connecting said chamber with the lower portions of the respective cylinders and passageways leading from said lower portions of said cylinders to the exterior of said casing, valves to control the flow of lubricant through the respective passageways, pistons in the respective cylinders having parts extending into said cavity, a closure for said cavity having an upwardly extending tubular portion, an actuating device comprising a head slidably mounted in said cavity, an elongate member connected with said head and slidable in said tubular portion of said closure, and means supported on said tubular portion and connected with said elongate member for imparting reciprocatory movement to said head and said piston.

12. A lubricating apparatus comprising a casing having a cylindrical cavity in the upper portion thereof, a lubricant chamber in the lower portion thereof, a plurality of bores extending downwardly from the bottom of said cavity and forming cylinders in the intermediate portion of said casing, passageways connecting said chamber with the lower portions of the respective cylinders, and passageways leading from said lower portions of said cylinders to the exterior of said casing, valves to control the flow of lubricant through the respective passageways, pistons in the respective cylinders having parts extending into said cavity, a closure for said cavity having an upwardly extending tubular portion provided with a lateral recess, an actuating device including a head slidably mounted in said cavity, an elongated member connected with said head, slidable in the tubular portion of said closure and having a longitudinal series of teeth, a toothed member mounted for oscillatory movement in said recess and meshing with the teeth of said elongate member, and means for oscillating said toothed member to impart reciprocatory movement to said head and said piston.

13. A lubricating apparatus comprising a casing having a cylindrical cavity in the upper portion thereof, a lubricant chamber in the lower portion thereof, a plurality of bores extending downwardly from the bottom of said cavity and forming cylinders in the intermediate portion of said casing, passageways connecting said chamber with the lower portions of the respective cylinders and passageways leading from said lower portions of said cylinders to the exterior of said casing, valves to control the flow of lubricant through the respective passageways, pistons in the respective cylinders having parts extending into said cavity, a closure for said cavity having an upwardly extending tubular portion provided with a lateral recess, an actuating device including a head slidably mounted in said cavity, an elongate member connected with said head, slidable in the tubular portion of said closure and having a longitudinal series of teeth, a toothed member mounted for oscillatory movement in said recess and meshing with the teeth of said elongate member, means for oscillating said toothed member to impart reciprocatory movement to said head and said pistons, said elongate member having a longitudinal passageway communicating with said cavity below said head, and lateral passageways leading from said longitudinal passage to the interior surface of said tubular portion of said closure and to said recess.

14. In a lubricating unit, a casing having therein a plurality of cylinders, each cylinder being provided with an inlet port to connect the same with a source of lubricant supply, inwardly opening valves to control the flow of lubricant through said ports, a plurality of discharge conduits leading from the respective cylinders, outwardly opening valves to control the flow of lubricant through said discharge conduits, a piston in each cylinder, a ram mounted for reciprocatory movement in said casing and connected with said pistons to move the latter in unison, a lever to reciprocate said ram, means for connecting said casing and said lever with relatively movable parts of a vehicle, one of which parts is movable toward and from the other part by the vertical movement of a wheel of said vehicle with relation to the body thereof, said lever comprising two parts pivotally connected one with the other, and yieldable means to normally retain said parts of said lever in fixed relative positions and to permit one part thereof to move about the axis of said connection with relation to the other part when subjected to excessive force.

15. A lubricating unit having means whereby it may be mounted on an apparatus having parts to be lubricated and comprising a casing having a part provided with a plurality of bores each constituting a cylinder, pistons in the respective cylinders, means for actuating said pistons in unison, said casing having at that end of said part opposite said actuating means a central opening adapted to communicate with a source of lubricant supply, radial passageways connecting said opening with the respective cylinders and other radial passageways in substantial alinement with the respective first mentioned passageways and leading from the respective cylinders to the exterior of said casing, separate valves to control the flow of lubricant through the respective passageways, and means for connecting the last mentioned passageways with the respective parts to be lubricated.

LEONARD J. SCHULHOFF.

REFERENCES CITED

The following references are of record in the file of this patent:

UNITED STATES PATENTS

| Number | Name | Date |
| --- | --- | --- |
| 661,323 | Richardson | Nov. 6, 1900 |
| 1,133,375 | Hansen | Mar. 30, 1915 |
| 1,591,160 | Davis | July 9, 1926 |
| 1,609,695 | Childers | Dec. 7, 1926 |
| 1,623,240 | Goodrich | Apr. 5, 1927 |
| 1,625,618 | Manzel | Apr. 19, 1927 |
| 1,929,972 | Groves | Oct. 10, 1933 |
| 1,940,793 | Eacock | Dec. 26, 1933 |
| 2,061,566 | Eacock | Nov. 24, 1936 |